April 19, 1932.    W. B. VIDRINE    1,854,635
COMBINATION SHADE, CURTAIN, AND DRAPE HANGER
Filed Sept. 11, 1931    3 Sheets-Sheet 1
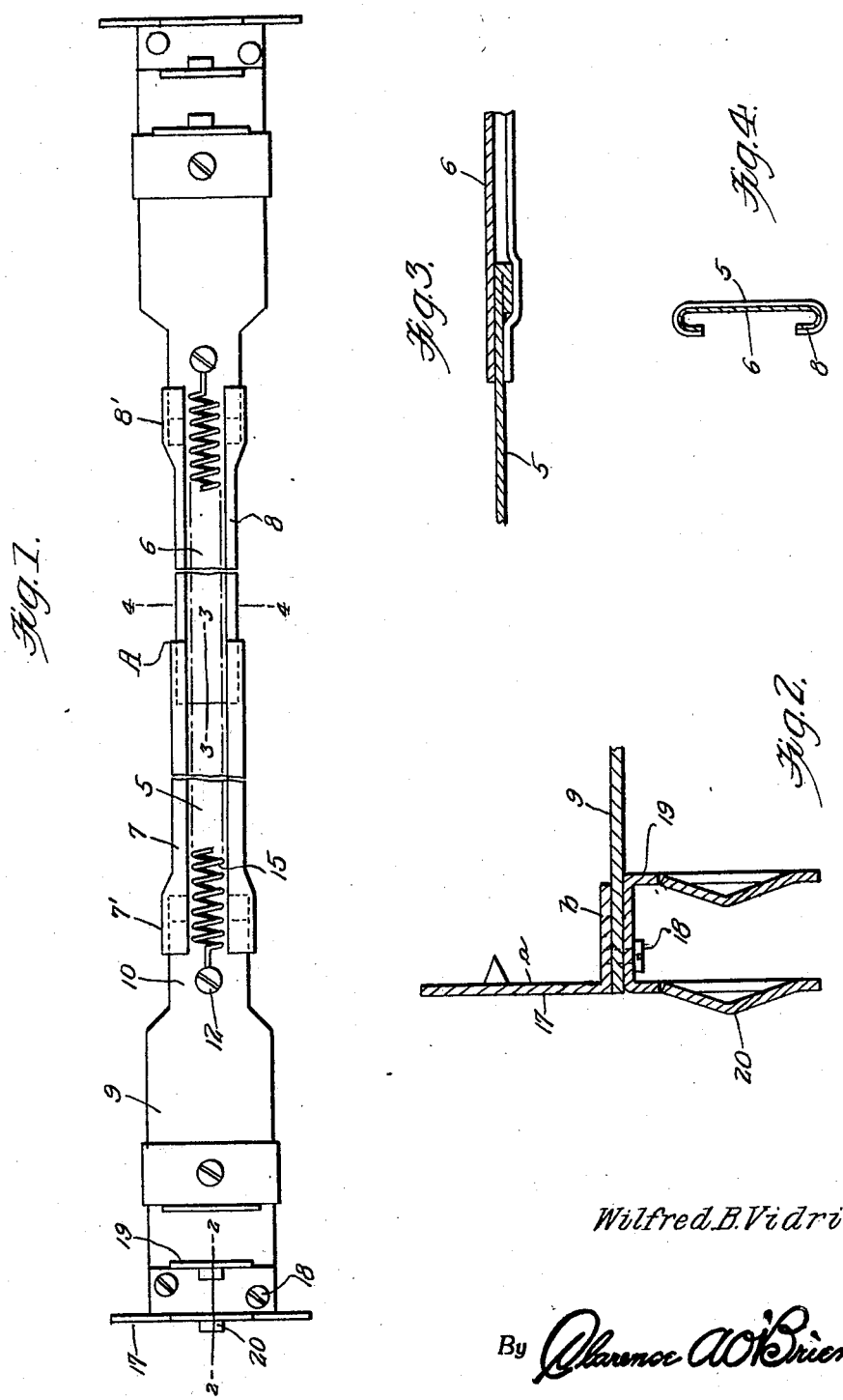
Inventor
Wilfred B. Vidrine,
By Clarence A. O'Brien
Attorney April 19, 1932. W. B. VIDRINE 1,854,635
COMBINATION SHADE, CURTAIN, AND DRAPE HANGER
Filed Sept. 11, 1931 3 Sheets-Sheet 2
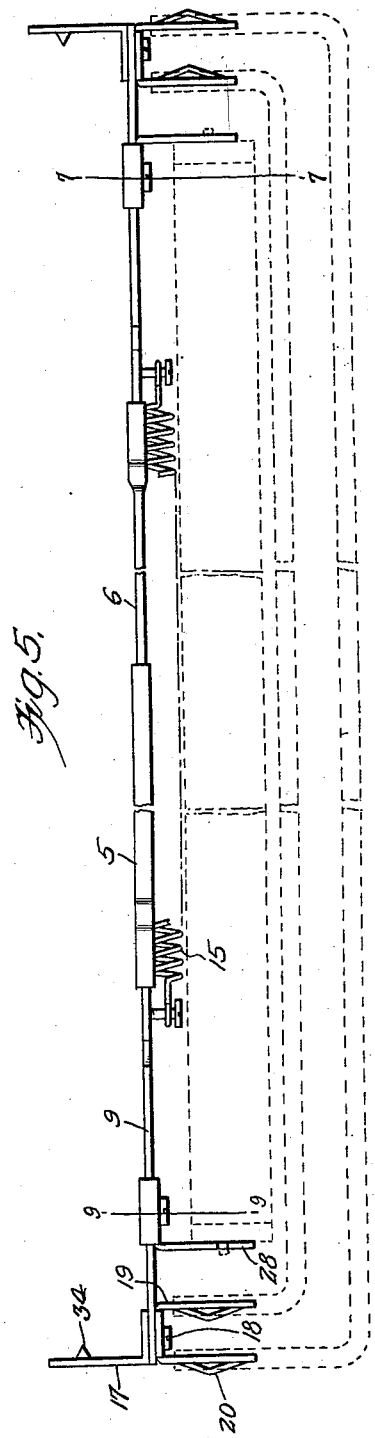
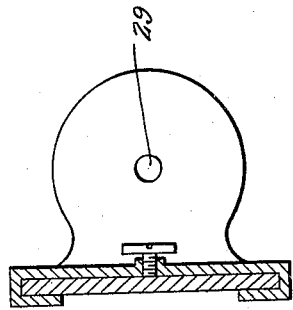
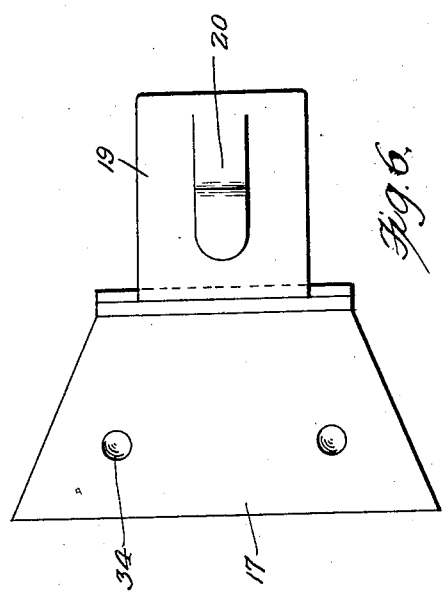
Inventor
Wilfred B. Vidrine,
By Clarence A. O'Brien
Attorney April 19, 1932. W. B. VIDRINE 1,854,635
COMBINATION SHADE, CURTAIN, AND DRAPE HANGER
Filed Sept. 11, 1931 3 Sheets-Sheet 3

Inventor
Wilfred B. Vidrine,

By Clarence A. O'Brien
Attorney

Patented Apr. 19, 1932

1,854,635

UNITED STATES PATENT OFFICE

WILFRED B. VIDRINE, OF LAKE CHARLES, LOUISIANA

COMBINATION SHADE, CURTAIN, AND DRAPE HANGER

Application filed September 11, 1931. Serial No. 562,369.

The present invention relates to a combination window shade, curtain and drape hanger and has for its prime object to provide an apparatus of this nature which may be readily and easily secured to a window frame in such a manner as to eliminate the necessity of using fastening elements such as screws, nails or the like to secure the apparatus in place thereby avoiding barring the window frame.

Another very important object of the invention resides in the provision of a hanger of this nature which may be adjusted for use in connection with window frames of various widths.

A further important object of the invention is to provide a hanger of this nature which is adjustable so that shades of various widths may be hung therefrom.

A still further very important object of the invention resides in the provision of a combination shade, curtain and drape hanger of this nature which is exceedingly simple in its construction, inexpensive to manufacture, strong and durable, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a front elevation of an apparatus embodying the features of my invention.

Figure 2 is a detail horizontal section taken substantially on the line 2—2 of Figure 1.

Figure 3 is a detail horizontal section taken substantially on the line 3—3 of Figure 1.

Figure 4 is a detail vertical section taken substantially on the line 4—4 of Figure 1.

Figure 5 is a top plan view of the apparatus.

Figure 6 is an end elevation thereof.

Figure 7 is a detail vertical section taken substantially on the line 7—7 of Figure 5.

Figure 9:
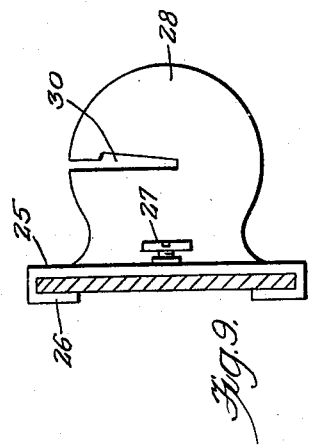
Figure 9 is a detail vertical section taken on the line 9—9 of Figure 5.
Figure 11:
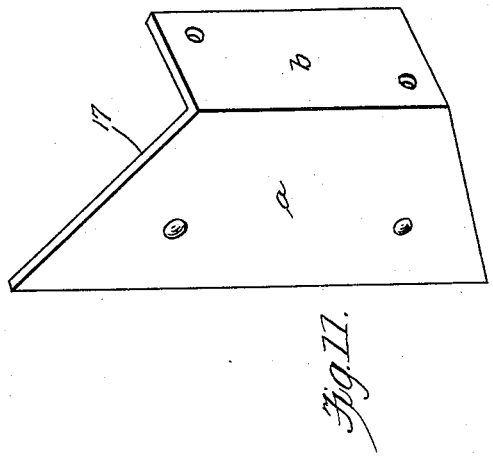
Figure 11 is a perspective view of one of the end clamps.
Figure 8:
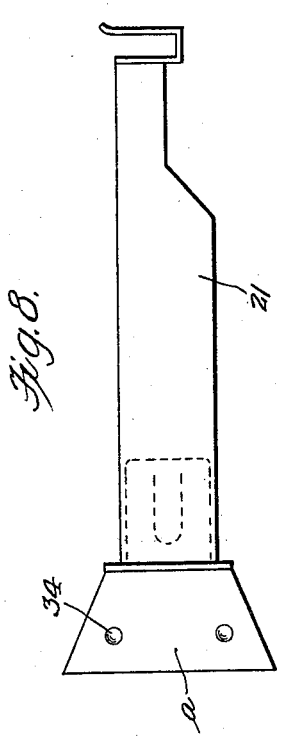
Figure 8 is a side elevation of the apparatus showing a drape bracket thereon.
Figure 10:
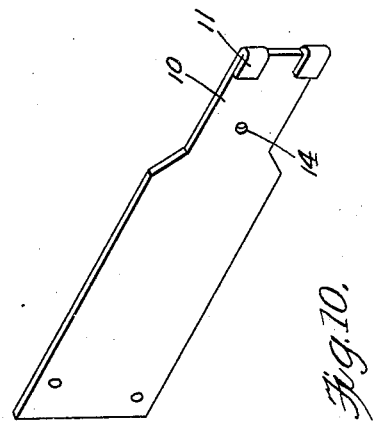
Figure 10 is a perspective view of one of the end pieces.

Referring to the drawings in detail, the device includes a main supporting member represented generally by the letter A and including a pair of sections 5 and 6 which are provided along their longitudinal edges with turn over flanges 7 and 8 respectively, the flanges 8 being slidably received in the flanges 7. The outer ends of the sections 5 are enlarged in width to form sockets. Elongated end pieces 9 have relatively narrow end portions 10 to fit in the sockets denoted by numerals 7' and 8' and in order that these ends 10 of the pieces 9 may fit snugly in place tongues 11 are folded over upon them so that the combined thickness of the tongues and the end portions 10 are substantially the same as the width of the sockets 7' and 8'.

Screws 12 are threaded in openings 14 in the inner end portions 10 of the end pieces 9 and a spring 15 has its ends anchored on the screws 12 tending to cause the section 6 to telescope in the section 5. Angular clamped pieces 17 have body portions *a* disposed at right angles to the end pieces 9 and flanges *b* secured to the end pieces 9 at ends thereof remote from the end portions 10 by means of screws 18. U-shaped brackets 19 are also held on the end pieces 9 by the screws 18 and their sides are formed with angular tongues 20 cut therefrom so that brackets 21 and the like may be frictionally engaged thereon.

Curtain shade brackets comprise plates 25 having flanges 26, turned over upon them as illustrated to advantage in Figures 7 and 9 and these plates are held in adjusted position by means of set screws 27. Bracket plates 28 project outwardly at right angles from the plates 25 and one is provided with an opening 29 and the other with a slot 30. Prongs 34 are pressed out from the bodies *a* of the clamp pieces 17 for the purpose of being embedded in the side edges of a window frame by means of the tension of the spring 15.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In an apparatus of the class described, a main supporting member including a pair of slidably connected sections, sockets formed on the outer ends of the sections, end pieces receivable in the sockets, and a spring having its ends connected to the end pieces to hold them in the sockets and tending to telescope one section in the other.

2. In an apparatus of the class described, a main supporting member including a pair of slidably connected sections, sockets formed on the outer ends of the sections, end pieces receivable in the sockets, and a spring having its ends connected to the end pieces to hold them in the sockets and tending to telescope one section in the other, clamp members on the end pieces having body portions extending at right angles therefrom.

3. In an apparatus of the class described, a main supporting member including a pair of slidably connected sections, sockets formed on the outer ends of the sections, end pieces receivable in the sockets, and a spring having its ends connected to the end pieces to hold them in the sockets and tending to telescope one section in the other, clamp memmers on the end pieces having body portions extending at right angles therefrom, and clamp portions extending in abutment therewith and held thereon by means of screws.

4. In an apparatus of the class described, a main supporting member including a pair of slidably connected sections, sockets formed on the outer ends of the sections, end pieces receivable in the sockets, and a spring having its ends connected to the end pieces to hold them in the sockets and tending to telescope one section in the other, clamp members on the end pieces having body portions extending at right angles therefrom, and clamp portions extending in abutment therewith and held thereon by means of screws, and U-shaped brackets having their cross portions also held to the end pieces by means of said screws.

5. In an apparatus of the class described, a main supporting member including a pair of slidably connected sections, sockets formed on the outer ends of the sections, end pieces receivable in the sockets, and a spring having its ends connected to the end pieces to hold them in the sockets and tending to telescope one section in the other, clamp members on the end pieces having body portions extending at right angles therefrom, and clamp portions extending in abutment therewith and held thereon by means of screws, and U-shaped brackets having their cross portions also held to the end pieces by means of said screws, the side portions of the brackets having tongues of angular construction struck therefrom.

In testimony whereof I affix my signature.

WILFRED B. VIDRINE.